United States Patent
Westerdal

(10) Patent No.: US 7,797,410 B2
(45) Date of Patent: Sep. 14, 2010

(54) REVERSE IP METHOD AND SYSTEM

(75) Inventor: Jay Westerdal, Bellevue, WA (US)

(73) Assignee: Euro Convergence, SARL, Leudenlange (LU)

( * ) Notice: Subject to any disclaimer, the term of this patent is extended or adjusted under 35 U.S.C. 154(b) by 1344 days.

(21) Appl. No.: 10/836,499

(22) Filed: Apr. 29, 2004

(65) Prior Publication Data

US 2006/0031385 A1    Feb. 9, 2006

(51) Int. Cl.
G06F 15/173    (2006.01)
G06F 15/16    (2006.01)

(52) U.S. Cl. ................................ 709/223; 709/245

(58) Field of Classification Search .............. 709/203, 709/223, 224, 245
See application file for complete search history.

(56) References Cited

U.S. PATENT DOCUMENTS

| | | | | |
|---|---|---|---|---|
| 5,774,660 A * | 6/1998 | Brendel et al. | ............. | 709/201 |
| 5,974,453 A * | 10/1999 | Andersen et al. | ............ | 709/220 |
| 6,119,171 A | 9/2000 | Alkhatib | | |
| 6,151,631 A | 11/2000 | Ansell | | |
| 6,249,801 B1 * | 6/2001 | Zisapel et al. | ............... | 718/105 |
| 6,430,623 B1 | 8/2002 | Alkhatib | | |
| 6,510,464 B1 * | 1/2003 | Grantges et al. | ............ | 709/225 |
| 6,553,413 B1 * | 4/2003 | Leighton et al. | ............ | 709/219 |
| 6,754,706 B1 * | 6/2004 | Swildens et al. | ............ | 709/225 |
| 2002/0073231 A1 | 6/2002 | Quarterman | | |
| 2002/0184390 A1 | 12/2002 | Alkhatib | | |
| 2003/0093438 A1 | 5/2003 | Miller | | |
| 2003/0149690 A1 | 8/2003 | Kudlacik | | |

OTHER PUBLICATIONS

Delivering mail to user@domain.com.
MV.COM policy: Reverse DNS, Jun. 27, 2003.
How Reverse DNS Works.
Internet Protocol Addressing.
DNS Reverse Mapping.
Generating DNS Records—DNS Generation.
Does AOL move defy ARIN rules??
Paul A. Farrell, Domain Name System—DNS, Apr. 16, 1996.
Definitions of ARIN on the Web.
Definitions of Zone file on the Web.
What are reverse (PTR) records? Why do I need them?
Domain Name Resolution.
Stefanie Olsen, AT&T spam filter loses valid e-mail, Jan. 24, 2003.
Tim Rohaly, How do I query a DNS server for the MX (or other) records it holds on a domain?, Jun. 26, 2001.
Understanding DNS to configure Merak Mail Server properly.

* cited by examiner

*Primary Examiner*—Hussein A Elchanti
(74) *Attorney, Agent, or Firm*—Michael L. Greenberg, Esq.; Greenberg & Lieberman, LLC

(57) ABSTRACT

The present invention provides a new and improved domain name searching method and system which comprises steps selected from the group consisting of (1) downloading all zone files, public and/or non-public, associated with one or more host names; (2) performing reverse DNS on IPs associated with said host names in associated root servers and name servers; (3) crawling websites associated with said host names and seeking new hosts on known websites in different TLDs; (4) indexing all new host names found; (5) resolving the associated IP address with each host name, and with optionally appending "www" thereby; (6) storing DNS entries and indexing same while logging their association with host names; (7) repeating any of steps (1) through (6) one or more times.

6 Claims, 1 Drawing Sheet

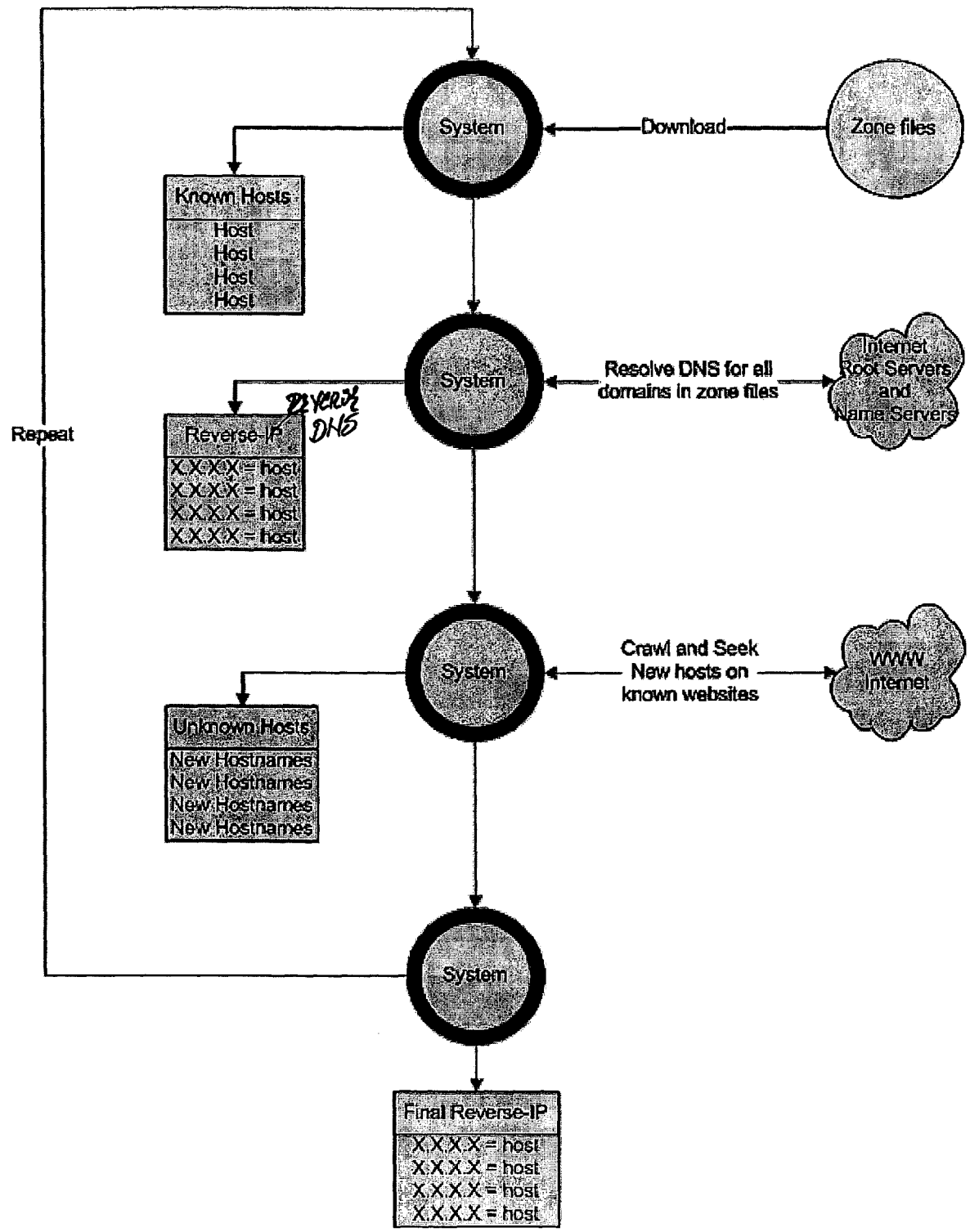

REVERSE IP METHOD AND SYSTEM

FIELD OF THE INVENTION

This invention relates to a method and system for monitoring the Internet, and more specifically to reverse DNS resolution.

BACKGROUND OF THE INVENTION

The Domain Name Service (DNS) is an important part of the Internet which employs names to identify Internet Protocol (IP) numeric addresses which serve as routing addresses on the Internet. Domain names are generally used as a convenient way to locate information and to reach others on the Internet as all computers communicate by addressing each other using IP addresses. It is the IP numeric address, however, which allows Internet communication, such as a telephone number, and not the domain name associated with the IP address. Thus, in operation the DNS system translates hostnames into numbers. Such DNS translation is oftentimes referred to as a "DNS lookup". This process occurs when one sends an e-mail or connects to a website, and has been characterized as similar in nature to obtaining the phone number of a person.

Sometimes, however, it is desired to find out what host name is associated with an IP address and to translate an IP address numeric information back into hostname(s). Thus, a numeric address can be translated, or otherwise resolved, by the DNS system to identify corresponding hostnames, which is a process known as reverse DNS resolution, or "reverse DNS lookup", and which is opposite to the usual name-to-address translation.

The DNS is composed of a directory of all the registered domain names and their corresponding computers registered to particular entities using the Internet, and which is organized in a hierarchical manner. Administration of the DNS starts through a group of Top Level Domain (TLD) servers which hold a list of servers, and which in turn hold data for sub-domains comprising each top level domain. An entity or person will run DNS servers for its own domain and will control DNS data, such as hostname, IP address, and the length of time an address is valid. There are two types of Top Level Domains, and are referred to as generic and countries. Examples of generic domains include .com (commercial), .edu (educational), .gov (United States government or municipality), .net (network providers), .int (international organizations), .mil (United States Armed Forces) and .org (non-profit organizations). Country domain names include one entry for each country, such as, for example, .ca (Canada), .th (Thailand), .am (America), and .bo (Bolivia). In a manner similar to telephone numbers, there may be multiple domain names which resolve to the same IP address. Conversely, a domain name may resolve to multiple IP addresses.

As is also known, Internet Web sites usually maintain a list of the addresses of visitors to a site. Reverse domain name resolution of such addresses, or translation of IP addresses back to domain names, will reveal a host of useful information associated with the IP address, such as, inter alia, geographic origin, authentication, hacker detection and tracing, spam detection and tracing, tracing traffic that goes through Firewalls, documentation and e-mail server validation, and other domain name information which can be used, for example, with who is to find out who administers a block of addresses. An IP address that is used on the Internet should have a proper configuration for a reverse DNS lookup, the result of which should match a forward lookup. In other words, when the name associated with an IP address is looked up one should be able to look up the IP address associated with that name to obtain the IP address initially observed or logged. Questions as to legitimacy of source arise when a domain name cannot be resolved, or a name is resolved which does not match an IP address, and which is perhaps indicative of spamming activity as a spammer oftentimes employs an invalid address which does not match a domain name. As reported, for example, in some spam blocking methods, a reverse DNS lookup program inputs an IP address of incoming messages to a DNS database. If no valid name is found to match the IP address a server blocks the incoming message.

Reverse DNS lookup to locate domain names that are in use and/or registered, and consequently those which are available for use by others as domain names and/or trademarks is extremely important in today's world to insure that a mark intended for use does not infringe anothers' name or mark, and/or is not confusingly similar to a registered name. Such a method will help to avoid unnecessary trademark litigation for infringing the Intellectual property rights of others and the waste of capital resources spent on promoting domain names and marks, or confusingly similar renditions, of names already in use by others. Additionally, such reverse DNS lookup will also ensure that a valuable domain is not accidently deleted or dropped from a registry, and further serve to alert one interested in registering a domain name which was previously unavailable.

Reverse name resolution, however, may oftentimes be problematic. For example, while reverse resolution may no doubt be effective for blocking spam, it is also equally effective in blocking legitimate e-mail if an existing domain name is not found. Various network glitches, such as improperly configured networks or servers, can prevent legitimate messages from getting through a reverse DNS spam filter. One recent notable example is AT & T World Net's attempted use of reverse DNS in conjunction with other anti-spam software which failed in short order and was removed in twenty-four hours after deployment, as many subscribers reported the nondelivery of e-mail messages. See CNET news article, "AT & T spam filter loses valid e-mail" (January, 2003). In addition to hosts having a forward DNS from name to numeric IP address, which may or may not have a reverse DNS from address to name, the sheer numbers of IP Internet addresses, said to be in the billions, with many millions of them having host names entered into the DNS system would seem to make reverse resolution a daunting task. Other problems that have interfered with efficient resolution include requiring responses from multiple systems to resolve DNS queries, adverse network conditions with overloaded sections of the Internet not responding to queries, and, for various reasons, the unavailability of name servers responsible for administering DNS data. Additionally, some Internet Service Providers (ISPs) for whatever reason do not enter their addresses in the DNS system.

In a standard DNS process of turning a hostname into an IP address, the process starts with a company registrar that a person's or an entity's domain name has been registered with. The DNS servers that are responsible for the domain name are identified to the registrar which forwards this information to root servers, or the parent servers, for the person's TLD. Anyone globally may now access the person's domains and the person may send them to any IP address as desired or contemplated. The domain name's owner and registrar has complete control over her domains, and may send people to any IP, notwithstanding whether the domain name owner has control over such IPs.

Conventional reverse DNS methods work in a similar manner. Identifying domain names associated with an IP address typically starts with a user's ISP, or whoever is responsible for designating the user's IP address. The domain name owner lets it be known what DNS servers are responsible for reverse DNS entries or queries for her IPs, and the ISP provides this information when the DNS servers are queried for reverse DNS entries, or reverse DNS entries or queries can be entered on a DNS server. With such public information anyone in the world may look up reverse DNS queries or entries for the person's IPs, and the person can return any hostname as desired, whether or not the person has control over a particular domain. A major problem with this method is that if a person's ISP is not aware of DNS servers to process reverse DNS inquiries for their IPs then such information will not be sent to a root server and no one will be able to access the person's DNS servers for reverse DNS lookups. Additionally, conventional DNS methodology will reveal only one domain name per IP address, whereas there may be many names associated with the IP address.

In one proposed partial solution to domain name location, in U.S. Patent Application Publication No. 2003/0149690 there is disclosed a method and apparatus for searching domain names world wide, and which purports to be effective in searching for all variations of a domain name in all jurisdictions, including those which do not make their zone file data available. This method uses what is referred to as data mining techniques in domain space by compiling databases combined with servers and a network of computers to search for registered domain names world wide. Searches for currently registered domain names are undertaken using certain letter/character strings and for domain names containing more than one letter/character string. Additionally, an end user is notified of newly identified domain names that match a predetermined search criterion such as to provide a domain name watching tool. This method, however, does not solve such problems as outlined above.

In U.S. Patent Application Publication No. 2002/0073231 there is disclosed a tracerouting method for a list of Internet hosts which is said to be effective for performing DNS lookup, and is also said to be effective in blocking/filtering out unwanted messages at the point of message receipt to pass on only expected messages to the rest of a program. Such a method is undesirable as many legitimate messages may be blocked in an attempt to reduce spam. Further, this method relies on Internet tracerouting which involves querying as to the path that messages take when going from one computer to another, or a list of computers that a message is routed through on its way to a final destination. Such data gathered from the routing operation is said to identify the Internet address, i.e. the IP address, and the Name of the computer, i.e. the Domain name. However, no reverse DNS lookup methods are contemplated or described in this method, and which the described method would arguably profit from.

Therefore, as can be appreciated by those persons utilizing the Internet in any way, there exists an important need, and a long overdue solution, for a reliable reverse DNS lookup method and system to identify all, or substantially all, hostnames associated with an IP address. There also exists an important need for such a reliable reverse DNS method and system to perform such important diverse tasks as, inter alia, diagnostics, security functions such as to trace hackers and to prevent spamming and various other authentication functions employing dual lookup, IP-to-name and name-to-IP mapping. There further exists an important need to monitor domain name registration and usage throughout the Internet, and to identify historical and current use of particular domain names for purposes of availability for registration and use and avoidance of intellectual property disputes and infringing upon the property of others.

SUMMARY OF THE INVENTION

In accordance with the drawbacks of conventional methods and the desired improvements as set forth above, the present inventive method and system, and method of doing business thereby, comprises an improved dual lookup, name-to-IP and IP-to-name capability which reliably identifies, authenticates and confirms one or more domain names associated with an IP address. More specifically, the present inventive dual lookup method and system comprises steps selected from the group consisting of: 1) starting with one or more domain names, downloading zone files associated therewith (inclusive of .com, .net, .org, .info, .biz, .us, .mil etc.); 2) performing reverse DNS on IPs associated with said host names in Internet root servers and name servers; 3) crawling websites associated with said host names and seeking new hosts on known websites in different TLDs; 4) indexing all new hostnames found; 5) resolving the associated IP address with each hostname, and optionally appending "www" in so doing; 6) storing DNS entries and indexing same while logging the association thereof with host names; 7) repeating steps 2, 3, 4, 5, and 6 one or more times.

The inventive method and system is more fully explained and will be more fully understood with reference to the following Detailed Discussion of Preferred Embodiments with accompanying drawing.

BRIEF DESCRIPTION OF THE DRAWING

FIG. 1. Is a schematic flow chart representation illustrating the inventive method and system.

DETAILED DISCUSSION OF PREFERRED EMBODIMENTS

All patent references, published patent applications and literature references referred to or cited herein are expressly incorporated by reference to the same extent as if each were specifically and individually indicated to be incorporated by reference. Any inconsistency between these publications and the present disclosure is intended to and shall be resolved in favor of the present disclosure.

As discussed above, a typical DNS query would be of the form, "what is the IP of host=www. in domain=find-domain. com", or other times one would like to be able to find out the name or names of one or more hosts whose IP address=x.x.x.x. As also discussed, the latter mapping exercise is useful for a variety of important functions, such as diagnostics, and perhaps more importantly, especially in recent times, for security purposes to trace hackers and/or to fight against spammers and for use in other authentication functions. In other important uses such reverse DNS resolution reveals the possible availability of domain names for registration, historical domain name usage, and provides a valuable trademark searching tool.

DNS is a distributed system and publically accessible. When one tries to access a name website, such as, for example, http://www.name.com., it must be determined what IP address www.name.com maps to. A request is typically sent to the person's local nameserver and is usually the nameserver of the person's ISP. The person's nameserver then contacts the nameserver of www.name.com. and the results, IP=x.x.x.x., are forwarded back to the person's nameserver. As known, some systems first check host files, and when that fails DNS is tried. Some examples of systems that first check host files include Linux, Windows 95 and Windows NT. Other systems may only check DNS first, and then check host files only if DNS fails. One example of such a system is QS/2. Some Unix systems, however, may check either way.

Finding a hostname given the IP address is an operation opposite to forward DNS, and, as explained above, is very desirable and useful for a variety of reasons, but is oftentimes not as straightforward and as easily executed as forward DNS. For a given IP address, reverse DNS starts with the ISP, or whatever entity designated the IP address. The DNS servers responsible for the reverse DNS entries for the IP address must be known, such that an ISP gives this information out when its DNS servers are queried for reverse DNS entries. A typical reverse DNS lookup path would be: DNS resolver=>root servers=>ARIN (North American IP Registry and/or RIPE or APNIC, the European and Asia-Pacific Registries)=>Local ISP=>lookup Name, Inc. DNS servers. Whatever entity supplies an IP address, for example, usually the ISP, it must either set up reverse DNS entries on their DNS servers or delegate authority for the reverse DNS entries to the DNS servers. In operation the Reverse DNS entries use a host name with a reversed IP address with ".in-addr.arpa" added to the IP address, such as, "x.x.x.x.in-addr.arpa". The DNS resolver then looks up the PTR record for x.x.x.x.in-addr.arpa, and checks the root servers (parent servers of a TLD) for the PTR record for x.x.x.x.in-addr.arpa. Next, the root servers refer the DNS resolver to the DNS servers in charge of the proper Class range (such as the range which covers all IPs that begin with "x" in this example), and generally the root servers will refer the DNS resolver to a Regional Internet Registry ("RIR"), which are organizations that allocate IPs, such as ARIN which handles North American IPs, APNIC which handles Asia-Pacific IPs and RIPE which handles European IPs. In particular, ARIN ("American Registry for Internet Numbers") is a non-profit membership organization established for the purpose of administration and registration of Internet Protocol (IP) addresses in the geographical areas that have in the past been managed by Network Solutions, Inc., and includes North America, South America, the Caribbean and sub-Saharan Africa. ARIN along with RIPE ("Reseaux IP Europeens") and APNIC ("Asia Pacific Network Information Center") manage the world's Internet address assignment and allocation. In, for example, a North American context, the DNS resolver will ask the ARIN DNS servers for the PTR record for x.x.x.x.in-addr.arpa., and the ARIN DNS servers will refer the DNS resolver to the DNS servers of the organization that was originally given the IP range of "x", which are usually the DNS servers of the ISP, or a bandwidth provider. Next, the DNS resolver will ask the ISP's DNS servers for the PTR record for x.x.x.x.in-addr.arpa, and the ISP's DNS servers will refer the DNS resolver to the organization's DNS servers. The DNS resolver will then ask the organization's DNS servers for the PTR record for x.x.x.x.in-addr.arpa, and the organizations's servers will respond with "host.name.com". One can then employ forward DNS to confirm that the found name maps back to the right IP address.

However, just because a host has forward DNS from name to address does not always mean that it has a reverse DNS address from address to name. Some sites do, and many do not, or do not have domain names which can be easily located through a procedure such as set forth above. Some sites may even attempt to hide their domain name for whatever reason, and may advertize their websites using it's IP address. Further, as can be seen, conventional methodology will only provide one domain name which is associated with an IP address, while multiple domain names can resolve to the same IP address.

Referring now to FIG. 1, in the present inventive method and system, a dual lookup query preferably starts with the name or names of one or more known hosts, and by downloading all possible zone files associated therewith, such as .com, .net, .org, .info, .biz, .us, .mil and the like. As known, a zone file designates a domain, its sub-domains and mail server, and contains information necessary to resolve domain names to IP addresses. Zone files may reside on the domain name host, name server or root server, and may contain the A record, CNAME and MX records. To put it another way, DNS name space is divided into zones throughout Internet space and contains servers which hold information concerning each zone. Usually a zone will have one primary name server and one or more secondary name servers which receive information from the primary server. When a DNS resolver process queries a domain name, the query is passed to a local name server. If the host being sought falls under the jurisdiction of that name server, then that domain name server returns the authoritative resource record—the managing authority for the record. If no information is available about the host, the name server sends a query message to the top level name server for the host requested, which will then provide resource records to the local name server. The use of both public and non-public zone files are contemplated in this invention.

Next, referring to FIG. 1, reverse DNS look up is carried out in the downloaded zones, including name servers and root servers. Reverse DNS in this step may be performed by any conventional method and means, such as described above. A step of crawling identified websites in the downloaded zones and looking for new hosts in different TLDs is also preferably performed.

All of the host names found are then indexed, and forward DNS is accomplished to resolve the IP address of each host name. Forward DNS may be performed by any conventional method and means, such as described above herein. Optionally, to each host name is appended "www" prior to performing forward DNS.

In another embodiment the MX records for each host name are resolved and searched. An MX record ("Mail Exchange Record" or "eMail exchanger") is an entry in a domain name database, an entry in a DNS table (zone file), that identifies the mail server that is responsible for handling e-mail for that domain name, or otherwise controls where e-mail is sent for that domain name. In other words, while A (Address) records convert host names into IP addresses (e.g., www.domain-name.com A x.x.x.x.), MX records are used for delivery of e-mail to its destination mail server. In general, e-mail addresses are composed of an alias and a domain name with an appended TLD, such as alias@domain.com. Each domain name should have at least one MX record, and for the most part e-mail delivery will not work for domains without an MX record. When more than one MX record is entered for any single domain name that is using more than one mail server, it is preferable to prioritize the MX record with a preference number which indicates the order in which the mail servers should be used, and which searches primary and backup mail servers (see, e.g., name.com MX mail.name.com 5, an MX record for the domain name "name.com" with a preference 5).

Next, a final reverse DNS look up is performed on the identified IP addresses, and the steps of forward and reverse DNS lookup are optionally repeated one or more times as desired to insure error reduction. Additionally, the above sequence of steps may performed at various time intervals to be used as historical time records, such that a log of domains associated with an IP address per time period may be provided.

The present inventive method and system, unlike conventional reverse DNS lookup, is advantageous in that it allows for more than one domain to be returned. Further, lookups can be preformed via a host name, IP address, or anything related to the IP address, such as ISP, or geographical information including region, State, Country, zip code and city information. As domains are reliably identified they may be used in current methods to block unwanted spam, and serve as a valuable source in indexing names in use and those which are available for use.

As will be readily appreciated by anyone knowledgeable of or associated with Internet use in any way, whether it be actual users or observers, the method and system of the present invention, its distribution, sale, offering for sale, licensing and/or advertising in conjunction therewith affords many advantages, not heretofore available, to conducting a business. Many of those persons knowledgeable of or associated with enterprises involving domain name registrations and availability, trademark availability and clearance and the like, and the spam blocking industry in general will appreciate the business advantages afforded by the present inventive method and system including all of its various aspects and possible embodiments.

It will be further appreciated by those persons skilled in the art that the embodiments described herein are merely exemplary of the principals of the invention. While some preferred embodiments have been described herein, modification in any way may become apparent to those of ordinary skill in the art following teaching of the invention, without departing from the spirit and scope of the invention as set forth in the appended claims. Additionally, any and all embodiments described herein are merely for illustrative purposes only and are specifically not intended to limit the scope of the invention and/or claims in any way.

I claim:

1. A computer system to obtain information regarding domain names and IP addresses, which system is comprised of the following components:
   a DNS query manager configured to access a database to obtain the results of forward and reverse DNS queries and, for each IP address identified, to have performed reverse DNS and for each domain name, host name, and/or name server to have a zone file obtained and to have performed forward DNS;
   said DNS query manager is configured to append at least one additional higher level domain name as a prefix to a second- and/or higher-level domain name associated with a host name and/or name server and/or to substitute a different top level domain suffix for the existing top level domain suffix on the character string of a second- or higher-level domain name to create a new domain name through the combination or substitution;
   a DNS resolver configured to perform forward and reverse DNS and to obtain zone files at the direction of the DNS query manager and to save the results in a database;
   a website crawler configured to crawl at least one website associated with a domain name at the direction of the DNS query manager and to save the results in a database;
   seeking new hosts on known websites in different TLD's;
   a database in which to save the result of forward and reverse DNS queries;
   a computer configured to index new host names found;
   a computer configured to resolve associated IP addresses with each host name;
   a computer configured to store DNS entries and index DNS entries while logging the association thereof with host names;
   a computer configured to perform a second DNS lookup on an identified IP address, as well as to forward and to reverse DNS lookups repeated at least once to prevent errors; and
   a computer configured to perform the above steps at various time intervals to create historical time records of domains associated with an IP address per time period.

2. The computer system according to claim 1 where the database and/or the DNS query manager and/or the DNS resolver is further configured to timestamp entries in the database and where if a new record is a duplicate of an old record, an entry in the database related to the duplicate record receives the new timestamp, and records which are not duplicates are not overwritten and/or deleted.

3. The computer system according to claim 1 where the DNS query manager is further configured to access the database and, for each MX record identified therein, to have performed forward and reverse DNS on entries in the MX record(s).

4. The computer system according to claim 1 where the DNS query manager and/or the database is further configured to cross-check the database entries to determine inconsistencies between and among the most recently obtained records.

5. The computer system according to claim 1 where the DNS query manager and/or the database is further configured to create database entries to map changes over time regarding the forward DNS resolution of domain names.

6. The computer system according to claim 3 where the DNS query manager is further configured to utilize the database entries and/or the result of analysis of the database entries to provide at least one service selected from a group comprising: verification that the email address of the sender of an email and/or that the IP address of a email server identified in a received email is in a corresponding entry in a zone file; notification of a party that a service which utilizes the DNS is unavailable; notification of a party that the zone file for and/or authority to resolve a domain name has changed; informing a party that a website associated with a domain name has changed; analyzing the performance of name servers in propagating DNS changes.

* * * * *